United States Patent
Stuempfl

(10) Patent No.: US 6,574,433 B1
(45) Date of Patent: Jun. 3, 2003

(54) UNDERWATER CAMERA HOUSING

(76) Inventor: Frank Stuempfl, 209 English St., Petaluma, CA (US) 94952

( * ) Notice: Subject to any disclaimer, the term of this patent is extended or adjusted under 35 U.S.C. 154(b) by 0 days.

(21) Appl. No.: 09/878,095

(22) Filed: Jun. 8, 2001

(51) Int. Cl.[7] .............................................. G03B 17/08
(52) U.S. Cl. ................................ 396/25; 27/29; 27/189
(58) Field of Search ........................... 396/25, 27, 29, 396/189; D16/200–208; 348/61, 148, 231, 373

(56) References Cited

U.S. PATENT DOCUMENTS

| | | | | |
|---|---|---|---|---|
| 2,944,474 A | * | 7/1960 | Dennis | 396/27 |
| 3,065,666 A | * | 11/1962 | Sampson | 352/242 |
| 3,703,131 A | * | 11/1972 | Brigham | 396/189 |
| 6,067,190 A | * | 5/2000 | Kelly | 359/407 |
| 6,327,430 B1 | * | 12/2001 | Ikemori et al. | 396/29 |

* cited by examiner

*Primary Examiner*—D. Rutledge
(74) *Attorney, Agent, or Firm*—Risto A. Rinne, Jr.

(57) ABSTRACT

An apparatus for placing a camera therein for use underwater includes a waterproof housing, a door, and a flat panel that is disposed at one end of the housing, the flat panel being transparent and extending throughout the one end. The camera includes a viewing lens that is adapted for placement adjacent the flat panel. A CD or cassette tape player provides a source of sound that is played through a pair of speakers for simultaneous recording of sound and images on a videocamera. A push button waterproof switch is attached to a cable, the cable is adapted for placement over a record button of the videocamera.

17 Claims, 1 Drawing Sheet

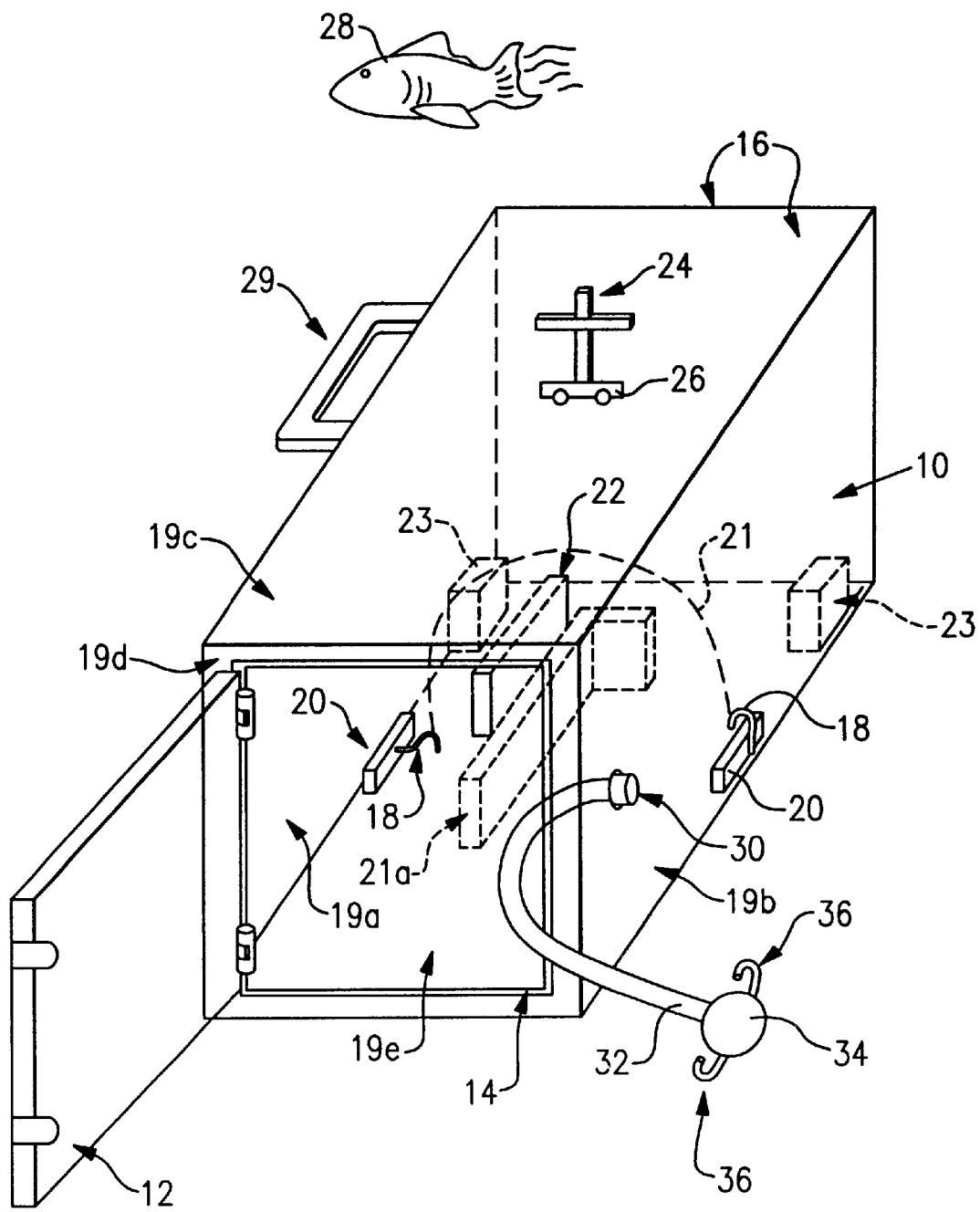

UNDERWATER CAMERA HOUSING

BACKGROUND OF THE INVENTION

1. Field of the Invention

The present invention, in general relates to housings for placing a camera in for use underwater and, more particularly, to housings for placing a videocamera therein.

Placing a camera in a waterproof housing for use underwater is well known. However, there are a number of problems associated with the previously known types of devices, in particular when they are used with videocameras, which are sometimes also commonly referred to as "camcorders".

The first such problem is to ensure that the lens of the videocamera aligns with a transparent portion of the housing. As there are numerous types of cameras and videocameras, the position of the lens changes with many of the designs. Therefore, it is difficult to ensure that a generic type of a housing will function with the great variety of photographic devices that exist or will soon be developed.

Another problem is that it is silent underwater and virtually all videocameras also record sound. Therefore, all of the videotapes (i.e., video tape recordings) that are produced underwater lack sound. This makes them less interesting to view. It would be ideal to record a musical soundtrack along with the underwater video images.

Another problem is that the user is unable to accurately point the videocamera at his target. How does he or she know that the camera sees what he sees? While certain known types of housings may include a "cross-hair" for sighting purposes, these devices do not protect against parallax and therefore do not ensure accurate alignment of the camera with the object being photographed.

Furthermore, there is no known way that is adapted for use with a wide variety of video cameras and which can be used to turn the camera on or off while it is disposed underwater.

Accordingly, there exists today a need for an underwater camera housing that accepts a variety of different types of videocameras, provides music, can turn the camera on or off while underwater, and helps align the camera with the subject.

Clearly, such an apparatus would be a useful and desirable device.

2. Description of Prior Art

Underwater camera housings are, in general, known. For example, the following describe various types of these devices:

U.S. Pat. No. 5,669,020 to Hopmeyer, Sep. 16, 1997;
U.S. Pat. No. 5,337,891 to Toth, Aug. 16, 1994;
U.S. Pat. No. 5,092,458 to Yokoyama, Mar. 3, 1992;
U.S. Pat. No. 4,982,841 to Goedecke, Jan. 8, 1991;
U.S. Pat. No. 4,860,038 to Thatcher et al., Aug. 22, 1989;
U.S. Pat. No. 4,281,343 to Monteiro, Jul. 28, 1981;
U.S. Pat. No. 4,183,650 to Jacobson, Jan. 15, 1980;
U.S. Pat. No. 3,821,759 to Vooght, Jun. 28, 1974;
U.S. Pat. No. 3,412,661 to Soumar, Nov. 26, 1968;
U.S. Pat. No. 3,065,666 to Sampson, Nov. 27, 1962;
U.S. Pat. No. 3,019,715 to Arnold et al., Feb. 6, 1962;
U.S. Pat. No. 2,994,474 to Dennis, Jul. 12, 1960;
U.S. Pat. No. 2,865,271 to Klein, Dec. 23, 1958;
U.S. Pat. No. 2,573,885 to Whitman et al., Nov. 6, 1951;
U.S. Pat. No. 2,487,868 to Grigsby, Nov. 15, 1949; and the following Design patents:
U.S. Design Pat. No. 332,459 to Morimiya, Jan. 12, 1993;
U.S. Design Pat. No. 304,202 to Niitsu, Oct. 24, 1989; and
U.S. Design Pat. No. 280,105 to Busch, Aug. 13, 1985.

While the structural arrangements of the above described devices, at first appearance, have similarities with the present invention, they differ in material respects. These differences, which will be described in more detail hereinafter, are essential for the effective use of the invention and which admit of the advantages that are not available with the prior devices.

OBJECTS AND SUMMARY OF THE INVENTION

It is an object of the present invention to provide an underwater camera housing that is inexpensive to manufacture.

It is also an important object of the invention to provide an underwater camera housing that can accept a variety of videocameras.

Another object of the invention is to provide an underwater camera housing that includes a flat transparent side, any area of which is adapted for the placement of a lens of a videocamera and for viewing through that area.

Still another object of the invention is to provide an underwater camera housing that provides a method for recording sound simultaneous with video images.

Still yet another object of the invention is to provide an underwater camera housing that aligns a videocamera with respect to a flat transparent side.

Yet another important object of the invention is to provide an underwater camera housing with a cross-hair having a profile that lessens parallax.

Still yet another important object of the invention is to provide an underwater camera housing that includes a hinged cross-hair.

Still one further object of the invention is to provide an underwater camera housing that includes an on-off push button that is adapted for use with a variety of videocameras and which can be used to turn the camera on and off while it is underwater.

Briefly, an underwater camera housing that is constructed in accordance with the principles of the present invention includes a waterproof enclosure that has a flat Plexiglas side that is transparent. The Plexiglas side is adapted to receive an objective lens of a videocamera at any location and to permit the viewing and recording of objects through the Plexiglas side. An elastic strap holds the videocamera against the side and therefore orients it perpendicular with respect to the side. A source of music (i.e., sound) is placed in the housing, such as a cassette or a CD player. The sound is outputted through a small pair of speakers or it may be electrically connected directly to the videocamera. A pair of hinged cross-hairs aid in aiming the videocamera and have a sufficient depth that tends to lessen the possibility of any parallax error occurring.

BRIEF DESCRIPTION OF THE DRAWING

FIG. 1 is a view in perspective of an underwater camera housing.

DETAILED DESCRIPTION OF THE INVENTION

Referring to FIG. 1 is shown, an underwater camera housing, identified in general by the reference numeral 10.

The housing 10 includes a hinged door 12 with a gasket seal 14. A rear panel 16 is formed of a flat sheet of clear Plexiglas and is in planar alignment with the door 12 when the door is closed and is disposed at an opposite end of the housing 10 as that of the door 12.

In use, a videocamera (not shown) is placed in the housing 10 through the open door 12 so that its viewing lens rests flush upon the inside of the rear panel 16.

Accordingly, a great variety of types of the videocamera may be placed in the housing 10 and be adapted for the viewing of underwater objects through any portion of the rear panel 16.

The rear panel 16 can be formed of any transparent material that is desired. Plexiglas, as mentioned is well suited for many applications as are other types of clear plastic materials.

Glass can also be used to form the rear panel 16. Various high grades of optical glass with high light transmission capabilities are suited for higher end (i.e., more expensive) types of the underwater camera housing 10 as is the use of coatings that may applied to the rear panel 16 to improve light transmission.

Besides ensuring that the videocamera will be able to see through the rear panel 16, it is important that the videocamera be held flush against it so that the housing 10 can be used for aiming of the videocamera, as is described in greater detail hereinafter.

A pair of hooks 18 are attached to a pair of blocks 20 that are secured to inside of the housing 10, the pair of blocks 20 are each attached to one of a pair of side panels 19a, 19b.

The side panels 19a, 19b are each attached to an opposite side of the rear panel 16 and form two of the sides of the overall structure of the housing.

A top panel 19c and a front panel 19d are all attached to each other so as to form a cubic type of a structure. The hinged door 12 is attached to the front panel 19d and an opening therein is accessed when the door 12 is opened.

An elastic strap 21 is attached at each end thereof to one of the pair of hooks 18 and it passes over the videocamera and secures the videocamera in position within the housing and also against (i.e., adjacent) the rear panel 16.

A rail 21a is provided on the inside of the housing 10 attached to a bottom panel 19e. The videocamera is placed on either side of the rail 21a (whichever is preferred).

A source of sound 22 such as a tape player or a CD player (shown in dashed lines) is placed in the housing and it is secured in place, as well as the videocamera, by the elastic strap 21.

A rubber band may be used for one embodiment of the elastic strap 21.

A pair of speakers 23 are connected to the source of sound 22.

A cross-hair 24 is attached to the top panel 19c by a hinge 26. The cross-hair 24 is thin but it includes a depth that is greater than one-quarter of an inch. Therefore, an operator (not shown) can detect misalignment of the housing 10 with respect to a subject 28 by an apparent thickening of the cross-hair 24 during use. This prevents parallax error from occurring.

When not in use, the hinge 26 allows the cross-hair 24 to fold flat against the top panel 19c.

A handle 29 is attached to the housing 10 where desired.

A sealed push button 30 is attached to a side panel 19b. The push button 30 pushes a cable (not shown) in a flexible tube 32. The tube 32 includes a first ring 34 that is formed of a half of hook and loop type of a fastener.

A second ring (not shown) includes the opposite type of a hook and loop fastener and it is attached by an adhesive around the "record" button of the videocamera.

Accordingly, the first ring 34 is simply pressed on the second ring to hold it in place or it is pulled therefrom to remove it. The push button 30 is pressed to turn the videocamera on and off during use.

A pair of second hooks 36 are attached to the first ring 34 on opposite sides thereof and are used to attach a second elastic strap (rubber band-not shown) thereto. The second elastic strap is placed around the videocamera and is helpful in securing the first ring 34 over the record button.

In use, the operator will attach the first ring 34 over the record button of the videocamera, insert the videocamera in the housing 10 through the open door 12, install the source of sound 22 and the speakers 23, use the first elastic strap 21 to secure the source of sound 22 and the videocamera, while further ensuring that the videocamera's lens is held flush against the rear panel 16, turn on source of sound 22, pivot the cross hair 24 to an upright position, close and latch the door 12, go underwater, and depress the push button 30 when the operator wants to record both images and audio (i.e., sound) simultaneously and press it again when the operator wishes to stop recording.

The source of sound will still continue to play unless a second push button (not shown) is provided for external control of the source of sound 22 or unless an electrical synchronization is provided between the videocamera and the source of sound 22 whereby the source of sound plays only when the videocamera is actually recording.

The audio that is being recorded can be either music or a narrative or both. If desired, the speakers can be eliminated or simply not used and an audio output of the source of sound 22 can be electrically connected to a sound input jack on the videocamera for even purer sound quality.

The invention has been shown, described, and illustrated in substantial detail with reference to the presently preferred embodiment. It will be understood by those skilled in this art that other and further changes and modifications may be made without departing from the spirit and scope of the invention which is defined by the claims appended hereto.

What is claimed is:

1. An underwater camera housing, comprising:
    (a) a waterproof housing, said housing adapted to receive a camera therein; and
    (b) a flat panel disposed at one end of said housing, said flat panel providing a physical interface between an interior of said housing and an exterior of said housing, said flat panel including an area that encompasses substantially all of said one end of said housing, said flat panel being substantially transparent and wherein said housing includes means for depressing a record button that is disposed on said camera, said means for depressing attached to said housing and adapted for actuation from said exterior of said housing and including means for detachably-attaching said means for depressing a record button proximate said record button.

2. The underwater camera housing of claim 1 wherein said camera includes a videocamera.

3. The underwater camera housing of claim 1 including a door attached to said waterproof housing.

4. The underwater camera housing of claim 1 wherein said flat panel includes a plastic.

5. The underwater camera housing of claim 4 wherein said plastic includes Plexiglas.

6. The underwater camera housing of claim 1 wherein said flat panel includes a glass.

7. The underwater camera housing of claim 1 including means for providing a source of sound that is disposed in said housing.

8. The underwater camera housing of claim 1 including means for aiming said housing at a subject.

9. The underwater camera housing of claim 8 wherein said means for aiming includes means for reducing parallax error.

10. The underwater camera housing of claim 9 including a cross-hair pivotally attached to said housing, said cross-hair including a predetermined depth sufficient to increase the apparent width of said cross-hair when said cross-hair is viewed at an oblique angle.

11. The underwater camera housing of claim 1 including a push button attached to said exterior of said housing and a cable that is attached at one end thereof to said push button at an interior of said housing and whereby said cable is attached at a remaining end thereof to said means for attaching said means for depressing and wherein said means for attaching said means for depressing includes a ring disposed around said remaining end of said cable, said ring including a first part of a hook and loop fastener attached thereto.

12. An underwater camera housing, comprising:
(a) a waterproof housing, said housing adapted to receive a camera therein; and
(b) a source of sound disposed in said housing.

13. The underwater camera housing of claim 12 wherein said source of sound includes a tape player.

14. The underwater camera housing of claim 12 wherein said source of sound includes a CD player.

15. The underwater camera housing of claim 12 wherein said source of sound includes at least one speaker disposed in said housing.

16. The underwater camera housing of claim 12 wherein said source of sound includes means for communicating a sound produced by said source of sound to said camera and wherein said camera includes a videocamera and whereby said videocamera is adapted to record said sound underwater simultaneous with an image.

17. An underwater camera housing, comprising:
(a) a waterproof housing, said housing adapted to receive a camera therein; and
(b) a flat panel disposed at one end of said housing, said flat panel providing a physical interface between an interior of said housing and an exterior of said housing, said flat panel including an area that encompasses substantially all of said one end of said housing, said flat panel being substantially transparent and including means for aiming said housing at a subject and wherein said means for aiming includes means for reducing parallax error that includes a cross-hair pivotally attached to said housing, said cross-hair including a predetermined depth sufficient to increase the apparent width of said cross-hair when said cross-hair is viewed at an oblique angle.

* * * * *